(12) United States Patent
Lehtinen et al.

(10) Patent No.: US 10,968,078 B2
(45) Date of Patent: Apr. 6, 2021

(54) METHOD AND HOISTING DEVICE

(71) Applicant: Kone Corporation, Helsinki (FI)

(72) Inventors: Hannu Lehtinen, Helsinki (FI); Jukka Penttila, Helsinki (FI); Juha Helenius, Helsinki (FI)

(73) Assignee: Kone Corporation, Helsinki (FI)

(*) Notice: Subject to any disclaimer, the term of this patent is extended or adjusted under 35 U.S.C. 154(b) by 589 days.

(21) Appl. No.: 15/889,571

(22) Filed: Feb. 6, 2018

(65) Prior Publication Data

US 2018/0229970 A1 Aug. 16, 2018

(30) Foreign Application Priority Data

Feb. 14, 2017 (EP) ..................................... 17156034

(51) Int. Cl.
*B66B 7/12* (2006.01)
*B66B 7/06* (2006.01)
(Continued)

(52) U.S. Cl.
CPC .............. *B66B 7/1215* (2013.01); *B66B 1/24* (2013.01); *B66B 7/062* (2013.01); *B66B 7/1223* (2013.01); *D07B 1/145* (2013.01); *D07B 1/162* (2013.01); *D07B 1/22* (2013.01); *G01L 1/22* (2013.01); *G01L 1/225* (2013.01);
(Continued)

(58) Field of Classification Search
CPC .............. D07B 2501/2007; D07B 1/16; D07B 2301/259; D07B 2801/24; D07B 5/00; B66B 11/008; B66B 11/08; B66B 7/06; B66B 11/0075; B66B 11/06; B66B 15/02; B66B 1/3476; B66B 5/0006; B66B 9/083; B66B 5/0012; B66B 7/12; B66B 7/1215;
(Continued)

(56) References Cited

U.S. PATENT DOCUMENTS

2002/0194935 A1 12/2002 Clarke et al.
2003/0111298 A1* 6/2003 Logan ................... B66B 7/1238
 187/391
(Continued)

FOREIGN PATENT DOCUMENTS

CN 101495395 A 7/2009
CN 102491142 A 6/2012
(Continued)

OTHER PUBLICATIONS

Extended Europeant Search Report for European Patent No. 17156034 dated Aug. 23, 2017.
(Continued)

*Primary Examiner* — Marlon T Fletcher
(74) *Attorney, Agent, or Firm* — Harness, Dickey and Pierce, P.L.C.

(57) ABSTRACT

The invention relates to a method for monitoring condition of a rope of a hoisting device, which rope comprises one or more load bearing members oriented to extend parallel with longitudinal direction of the rope throughout the length thereof. The method comprises measuring strains of one or more portions of a load bearing member of the rope; and comparing the measured strains of one or more portions of a load bearing member of the rope with at least one reference. The invention also relates to a hoisting device implementing the method.

20 Claims, 4 Drawing Sheets

(51) Int. Cl.
*D07B 1/14* (2006.01)
*G01L 1/22* (2006.01)
*B66B 1/24* (2006.01)
*D07B 1/16* (2006.01)
*D07B 1/22* (2006.01)

(52) U.S. Cl.
CPC .. *D07B 2205/20* (2013.01); *D07B 2205/3003* (2013.01); *D07B 2205/3007* (2013.01); *D07B 2501/2007* (2013.01)

(58) Field of Classification Search
CPC ...... G01B 7/16; B60P 1/36; B60P 1/14; B60P 1/6418; B60P 3/40
See application file for complete search history.

(56) References Cited

U.S. PATENT DOCUMENTS

| | | | | |
|---|---|---|---|---|
| 2005/0211507 | A1* | 9/2005 | Mustalahti | B66B 7/1215 187/411 |
| 2013/0206516 | A1* | 8/2013 | Pelto-Huikko | B66B 9/00 187/254 |
| 2014/0182974 | A1* | 7/2014 | Puranen | B66B 5/0018 187/247 |
| 2014/0305744 | A1* | 10/2014 | Kere | B66B 7/06 187/254 |
| 2014/0345978 | A1* | 11/2014 | Alasentie | D07B 1/02 187/254 |
| 2015/0329319 | A1* | 11/2015 | Lehtinen | B66B 7/1215 187/254 |
| 2015/0362450 | A1* | 12/2015 | Lehtinen | G01N 27/20 187/391 |
| 2016/0046463 | A1* | 2/2016 | Saarelainen | B66B 5/02 187/254 |
| 2016/0340150 | A1* | 11/2016 | Helenius | B66B 5/0006 |
| 2017/0057788 | A1* | 3/2017 | Helenius | B66B 7/062 |
| 2017/0328001 | A1* | 11/2017 | Kirth | D07B 1/025 |
| 2018/0229970 | A1* | 8/2018 | Lehtinen | D07B 1/145 |
| 2019/0218062 | A1* | 7/2019 | Padilla | G01N 29/226 |

FOREIGN PATENT DOCUMENTS

| | | |
|---|---|---|
| CN | 203283973 U | 11/2013 |
| DE | 102012108036 B3 | 12/2013 |
| JP | H07125946 A | 5/1995 |
| JP | H10318741 A | 12/1998 |

OTHER PUBLICATIONS

Chinese Office Action dated Jun. 29, 2020 issued in corresponding Chinese Application No. 2018101506822.

* cited by examiner

METHOD AND HOISTING DEVICE

This application claims priority to European Patent Application No. EP171560345 filed on Feb. 14, 2017 the entire contents of which are incorporated herein by reference.

FIELD OF THE INVENTION

The invention relates to inspecting condition of a rope of a hoisting device. The hoisting device is preferably an elevator for vertically transporting passengers and/or goods.

BACKGROUND OF THE INVENTION

In hoisting devices such as elevators, one or more ropes are used as the means by which the load to be hoisted is suspended. Ropes of an elevator are normally either round in cross section or belt-shaped. Each elevator rope typically includes one or more load bearing members that are elongated in the longitudinal direction of the rope, each forming a structure that continues unbroken throughout the length of the rope. Load bearing members are the members of the rope which are able to bear together the load exerted on the rope in its longitudinal direction. The load, such as a weight suspended by the rope, causes tension on the load bearing member, which tension can be transmitted by the load bearing member in question all the way from one end of the rope to the other end of the rope. Ropes may further comprise non-bearing components, such as a coating, which cannot transmit tension in the above described way. The coating can be utilized for protection of the load bearing members and/or facilitating contact with rope wheels and/or for positioning adjacent load bearing members relative to each other, for example. The coating can be made of polymer material. The load bearing members are typically made of twisted steel wire cords but they can be also made of twisted aramid cords or composite material wherein the fibers are embedded in a polymer matrix.

In prior art, the condition of the load bearing members has been inspected by monitoring electrical properties of the load bearing members, such as the resistance of a circuit formed partially by the load bearing members or the resistance of a circuit formed partially by conductor wires embedded inside the load bearing members.

It has been now found out that prior art inspection methods, such as those monitoring electric properties, do not reliably reveal all kinds of damages in all kinds of ropes. It has been found out that certain internal cracks, and particularly internal delamination of a single load bearing member made of composite material, are difficult to be noticed by existing inspection methods. It has been noticed that this is due to that delamination does not affect all the properties of the rope sufficiently to enable early noticing thereof. This is because a delamination forms a crack extending substantially parallel with the longitudinal direction of the rope. Therefore delamination is not easily visible outside. Moreover, the conductive cross-sectional area is usually not considerably affected by delamination, whereby electrical properties such as resistance of the load bearing member, for instance, may not be changed enough for noticing delamination. Due to challenges in prior art solutions, a need for an improved method for condition monitoring has been risen.

BRIEF DESCRIPTION OF THE INVENTION

The object of the invention is to introduce an improved method for monitoring condition of a rope of a hoisting device, such as an elevator, as well as a improved hoisting device monitoring condition of a rope thereof. An object is to introduce a solution by which one or more of the above defined problems of prior art and/or problems discussed or implied elsewhere in the description can be solved. An object is particularly to introduce a solution by which a crack, and in particular a delamination, developed inside a load bearing member of a rope can be detected, localized and reacted to. Embodiments are presented, inter alia, wherein these objects are achieved in condition monitoring of a fiber reinforced composite load bearing member of a rope of a hoisting device.

It is brought forward a new method for monitoring condition of a rope of a hoisting device, which rope comprises one or more load bearing members oriented to extend parallel with longitudinal direction of the rope throughout the length thereof. The method comprises measuring strains of one or more portions of a load bearing member of the rope; and comparing the measured strains of one or more portions of a load bearing member of the rope with at least one reference. With this solution one or more of the above mentioned objects can be achieved. Preferable further details are introduced in the following, which further details can be combined with the method individually or in any combination.

In a preferred embodiment, strain of each said portion is measured when the portion is arched, in particular arched around an axis extending in width direction of the rope. The portion is then under bending tension.

In a preferred embodiment, strain of each said portion is measured when the portion is arched, and the measuring point is a point of the portion where the portion substantially arcs, i.e. does not extend straight, preferably with diameter less than 1.5 meters.

In a preferred embodiment, strain of each said portion is measured when the portion rests on a circumference of a rope wheel of the hoisting device.

In a preferred embodiment, each said load bearing member is made of composite material comprising reinforcing fibers embedded in polymer matrix, said reinforcing fibers preferably being carbon fibers or glass fibers. With this type of load bearing members the method is particularly advantageous as in this type of load bearing members cracks can develop in long term use. With this type of load bearing members the strain measurements can be effectively used for early detection of particularly delamination cracks which would be laborious and difficult by other means. The strains measurements can also relatively reliably be utilized for condition monitoring, because in this kind of material, the deformation is elastic.

In a preferred embodiment, the rope comprises a coating forming an outer surface of the rope, in which coating the one or more load bearing members are embedded. The coating is preferably made of polymer material such as polyurethane.

In a preferred embodiment, the reinforcing fibers of each load bearing member are distributed in the polymer matrix of the load bearing member in question and bound together by it. The reinforcing fibers of each load bearing member are then preferably substantially evenly distributed in the polymer matrix of the load bearing member in question. Furthermore, preferably, over 50% of the cross-sectional square area of the load bearing member consists of said reinforcing fibers. Thereby, a high tensile stiffness can be facilitated.

In a preferred embodiment, the rope is a belt and substantially larger in its width-direction than in its thickness-direction. This has the consequence that it is bent always around in same way in use i.e. around an axis extending in width direction of the rope. Thus, reliability and usability of the strain measuring for comparison are facilitated. Moreover, design of the strain measuring arrangement need not be complicated because it can be built on assumption that the bending is always substantially similar. Preferably, the rope is either a smooth-sided belt without an uneven surface pattern or alternatively a belt having at least one side provided with an uneven surface pattern, such as a rib pattern comprising ribs protruding in thickness direction of the rope or a tooth pattern comprising teeth protruding in thickness direction of the rope.

In a preferred embodiment, said load bearing member is non-circular and oriented to extend parallel with longitudinal direction of the rope throughout the length thereof without twisting around its longitudinal axis, the cross-section of said load bearing member being constant throughout the length of the rope. Hereby, the strain measurement becomes more simple and trustworthy in comparison.

In a preferred embodiment, said measuring is performed by aid of one or more strain gauges. Said one or more strain gauges are then preferably fixed on the one or more portions of the load bearing member. Each said strain gauge is then fixed against a surface of the load bearing member.

In a preferred embodiment, the rope comprises one or more strain gauges fixed on each of said one or more portions of the load bearing member for measuring strain of the portion with one or more strain gauges.

In a preferred embodiment, each said strain gauge is covered by said coating.

In a preferred embodiment, the method comprises measuring strains of plurality of portions of a load bearing member of the rope; and comparing each measured strain with at least one reference, wherein said portions (A,B) are portions of a load bearing member of the rope successive in longitudinal direction of the load bearing member of the rope.

In a preferred embodiment, said at least one reference comprises a reference input by a person in the monitoring system of the hoisting device performing said method and/or a reference determined automatically by the monitoring system of the hoisting device performing said method.

In a preferred embodiment, said at least one reference comprises a reference which is a strain measured from the same portion of the load bearing earlier, or a strain measured from some other portion of the load bearing, or a strain which is an average strain calculated from plurality of measured strains of one or more portions of the load bearing, or a measured strain of a portion of another, parallel, load bearing member extending parallel with the load bearing member under inspection, said portion of another parallel load bearing member preferably being beside the portion in question.

In a preferred embodiment, the method comprises performing said measuring and comparing for at least two parallel load bearing members. Said two parallel load bearing members are then load bearing members of the same rope or of two parallel ropes.

In a preferred embodiment, the measured strain and reference have each a numerical value.

In a preferred embodiment, the method comprises performing one or more predefined actions if the comparison fulfills one or more criteria. Said criteria include preferably one or more of the following: the measured strain is greater than a reference, the measured strain is equal to a reference the measured strain is smaller than a reference, the measured strain is null. These all criteria can be monitored simultaneously using a reference range having two end points, whereby a range of acceptable strain values can be provided. Obtained null measurement can be used as an indicator of measurement malfunction of severe damage.

In a preferred embodiment, said one or more predefined actions include one or more of the following: sending an alarm signal, stopping the hoisting device, preventing use of the hoisting device.

In a preferred embodiment, said measuring is performed using one or more strain gauges fixed on a face of the load bearing member which face faces in width direction of the rope and/or using one or more strain gauges fixed on a face of the load bearing member, which face faces in thickness direction of the rope.

In a preferred embodiment, said measuring is performed using one or more strain gauges having a measuring direction parallel with the longitudinal direction of the load bearing member on which it is fixed.

In a preferred embodiment, said measuring is performed using one or more strain gauges having a measuring direction at an angle relative to the longitudinal direction of the load bearing member on which it is fixed.

In a preferred embodiment, said one or more strain gauges having a measuring direction at an angle relative to the longitudinal direction of the load bearing member on which it is fixed are fixed on the side face of the load bearing member.

In a preferred embodiment, said measuring is performed using at least two strain gauges fixed on the same portion of the load bearing member and crossing each other. Then, they preferably each have a measuring direction at an angle relative to the longitudinal direction of the load bearing member on which it is fixed.

In a preferred embodiment, the rope is substantially larger in its width-direction than thickness-direction and the strain gauges of the rope comprises strain gauges that are outside the thickness directional projection of the load bearing members of the rope In a preferred embodiment, each said strain gauge is an ohmic resistance strain gauge.

In a preferred embodiment, each said strain gauge comprises a conductor extending in the measuring direction of the strain gauge, and in the method the strain is measured from an electrical property of the conductor, most preferably the ohmic resistance thereof.

In a preferred embodiment, the method comprises transmitting measurement data from strain gauges to an external receiver with a wireless communication unit installed within the rope. Preferably, the wireless communication unit comprises an antenna for transmitting wirelessly data.

In a preferred embodiment, the wireless communication unit is an RFID unit.

In a preferred embodiment, the wireless communication unit is an RFID unit with a chip and an antenna arranged to provide the required power to the chip for energizing its operation and to transmit wirelessly data to an external receiver.

In a preferred embodiment, the method comprises supplying energy to the wireless communication unit by a device external to the rope, preferably by a wireless receiver in proximity of the rope. The wireless receiver then preferably forms a chip reader for reading the chip of the RFID unit.

In a preferred embodiment, the wireless communication unit is within the rope and covered by the coating.

In a preferred embodiment, the rope is substantially larger in its width-direction than thickness-direction and the wireless communication unit installed within the rope outside the thickness directional projection of the load bearing members of the rope.

In a preferred embodiment, said rope is a rope installed in the hoisting device.

In a preferred embodiment, said rope is a rope installed in a hoisting device and already used therein for a period of time. Said period can be for example more than a month but the period can be longer more than a year.

In a preferred embodiment, said rope is a rope installed in the hoisting device in a position where it is to be used and said measuring is performed without removing the rope from its position in the hoisting device.

In a preferred embodiment, said rope is connected to and suspends one or more loads of the hoisting device when said measuring is performed. Thus, the monitoring can be performed online without removing or dismantling of components of an installed hoisting device, such as an installed elevator system.

In a preferred embodiment, the rope is a suspension rope of an elevator for suspending an elevator car.

In a preferred embodiment, said hoisting device is an elevator for transporting passengers and/or goods. In this case, the aforementioned one or more loads comprise an elevator car for receiving passengers and/or goods and/or a counterweight of an elevator.

In a preferred embodiment, the method is performed automatically by a monitoring system of the hoisting device.

In a preferred embodiment, the elevator is connected with a remote monitoring system, and configured to communicate with the remote monitoring system, said communication preferably including at least providing a remote monitoring unit strain measurement data obtained by said measuring strains of one or more portions of a load bearing member of the rope. Thus, this data can be utilized in scheduling service of the hoisting device in question, or analysis of the hoisting device in question, for example. Receiving such data particularly facilitates pre-emptive maintenance by the remote monitoring system and its operators. Said providing can include storing said strain measurement data into a cloud database accessible by the remote monitoring system.

It is also brought forward a new hoisting device, preferably an elevator, comprising a rope comprising one or more load bearing members oriented to extend parallel with longitudinal direction of the rope throughout the length thereof. The elevator is configured to measure strains of one or more portions of a load bearing member of the rope; and compare the measured strains of one or more portions of a load bearing member of the rope with at least one reference. With this solution one or more of the above mentioned objects can be achieved.

In a preferred embodiment, the elevator comprises means for measuring strains of one or more portions of a load bearing member of the rope; and for comparing the measured strains of one or more portions of a load bearing member of the rope with at least one reference.

In a preferred embodiment, said means comprise one or more strain gauges, in particular one or more strain gauges fixed on each of said one or more portions of the load bearing member for measuring strain of the portion with one or more strain gauges.

In a preferred embodiment, the hoisting device is configured to perform the method as described anywhere above or elsewhere in the application. The hoisting device can be configured to perform any one of the above mentioned method steps individually or in any combination.

When the hoisting device is an elevator, the elevator is preferably such that the car thereof is vertically movable and configured to serve two or more vertically displaced landings. The elevator is furthermore preferably configured to control movement of the car in response to signals from user interfaces located at landing(s) and/or inside the car so as to serve persons on the landing(s) and/or inside the elevator car. Preferably, the car has an interior space suitable for receiving a passenger or passengers, and the car can be provided with a door for forming a closed interior space.

BRIEF DESCRIPTION OF THE DRAWINGS

In the following, the present invention will be described in more detail by way of example and with reference to the attached drawings, in which.

DETAILED DESCRIPTION

Figure 1:
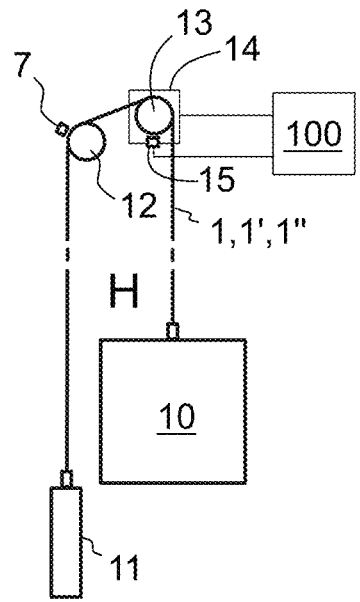
FIG. 1 illustrates an embodiment of a hoisting device according to invention configured to execute a method for monitoring condition of a rope
Figure 2:
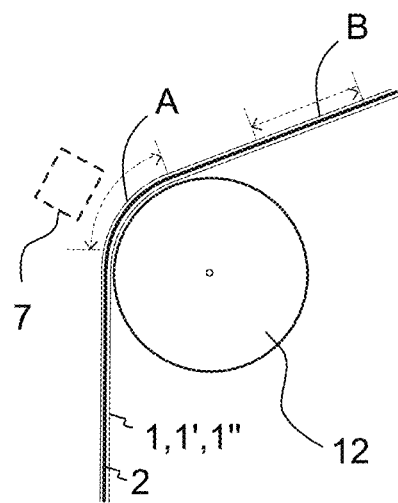
FIG. 2 illustrates an enlarged partial view of FIG. 1.

FIG. 1 illustrates an embodiment of a hoisting device according to invention configured to execute a method for monitoring condition of a rope 1,1',1" of the hoisting device according to the invention. The hoisting device illustrated is an elevator for transporting passengers and/or goods. FIG. 2 illustrates an enlarged partial view of FIG. 1.

The hoisting device comprises one or more ropes 1,1',1", wherein said rope 1,1',1" comprises one or more load bearing members 2 oriented to extend parallel with longitudinal direction of the rope 1,1',1" throughout the length thereof. The rope 1,1',1" has been arranged to pass around a rope wheel 12.

The method for monitoring condition of a rope 1,1',1" comprises measuring strains of one or more portions A,B of a load bearing member 2 of the rope 1,1',1"; and comparing the measured strains with at least one reference. So as to be able to monitor more than a very short length of the load bearing member, the method comprises preferably although not necessarily, measuring strains of plurality of portions A,B of a load bearing member 2 of the rope 1,1',1" successive in longitudinal direction of the load bearing member 2 of the rope 1,1',1"; and comparing each measured strain with at least one reference. This is also advantageous for the reason that it facilitates using strain measurements from plurality of portions A,B for automatic determination of reference to be used in the comparison step. Said plurality of rope portions has in the examples presented only 2 portions A,B successive in longitudinal direction of the load bearing member 2 of the rope 1,1',1" showed. However, it is preferable that said plurality of portions A,B comprises more than 2 portions A,B successive in longitudinal direction of the load bearing member 2 of the rope 1,1',1", most preferably at least 10 portions A,B successive in longitudinal direction of the load bearing member 2 of the rope 1,1',1", whereby a substantial length of the load bearing member 2, such as its whole length, can be monitored.

Each said load bearing member 2 is preferably made of composite material comprising reinforcing fibers embedded in polymer matrix, said reinforcing fibers preferably being carbon fibers or glass fibers. With this type of load bearing members the strain measurements can be effectively used for early detection of delamination cracks which would be laborious and difficult by other means. In the preferred embodiment, the rope 1,1',1" further comprises a coating 3 forming an outer surface of the rope, in which coating 3 the one or more load bearing members are embedded. Such a coating 3 is preferable, however not necessary. The coating 3 is preferably made of polymer material, such as polyurethane.

The load bearing members 2 are preferably further such that the aforementioned reinforcing fibers of each load bearing member are distributed in the polymer matrix of the load bearing member in question and bound together by it. The reinforcing fibers of each load bearing member are then preferably substantially evenly distributed in the polymer matrix of the load bearing member in question. For facilitating stiffness and load bearing capacity, preferably over 50% of the cross-sectional area of the load bearing member 2 consists of said reinforcing fibers.

For implementing the method, the hoisting device comprises means 4,5,6,7,100 for measuring strains of one or more portions A,B of one or more load bearing members 2 of the rope 1,1',1" and for comparing each measured strain with at least one reference. Said means comprise in the embodiment presented in FIG. 2 a receiver unit 7 external to the rope 1,1',1" for receiving measuring data from strain gauges of the rope 1,1',1". Sub tasks related to said measuring and comparing can be assigned to the components in various alternative ways. Preferred alternatives are described elsewhere in the application in further detail. The hoisting device preferably comprises a control means 100 for automatically controlling movement of the load 10 of the hoisting device. In FIG. 1 the hoisting device is an elevator, wherein the load 10 is an elevator car 10 movable in a hoistway H. The control means 100 is preferably arranged to control rotation of a drive wheel 13 of the hoisting device around which ropes 1,1',1" connected with the load 10 pass, by controlling rotation of a motor 14 connected with said drive wheel 13 and/or a mechanical brake 15 for braking rotation of the drive wheel 13. The illustrated elevator also comprises a counterweight 11 connected with the car 10 by the ropes 1,1',1".

Internal structural anomalies developed in the load bearing members 2 can be detected by measuring strain appearing in the load bearing members 2. The principles have hereinafter been described by aid of FIG. 3, which illustrates an example where the rope 1,1',1" of a hoisting device comprising load bearing member 2 oriented to extend parallel with longitudinal direction of the rope 1,1',1" throughout the length thereof in a situation where the rope 1,1',1" has been bent into an arched form by bending it around a rope wheel and its load bearing member 2 has an internal delamination crack. The delamination crack d has been illustrated with a broken line. In this example, the delamination extends along the neutral axis of the load bearing member 2 as this is where the delamination crack is relatively likely to form during use of the rope which involves repeated bending of the rope.

Figure 3:
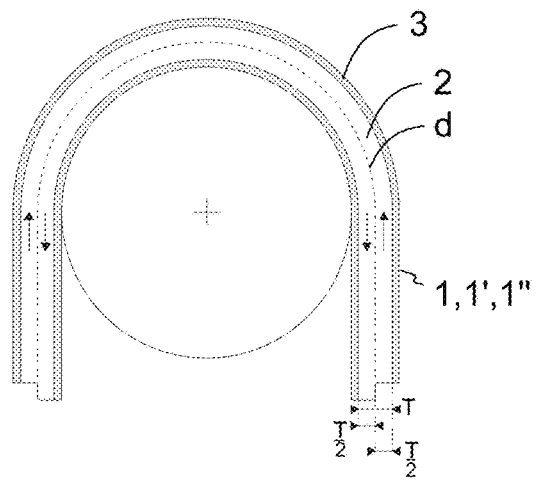
FIG. 3 illustrates an example where the rope of a hoisting device in a situation where the rope has been bent into an arched form and its load bearing member has an internal delamination crack.

The delamination on the neutral axis changes strain state of the profile when it is bent around a rope wheel. The thickness of an intact load bearing member is T. When the top and bottom halves of the load bearing member 2 are separated due to delamination, there are two separate profiles with thickness T/2 as illustrated in FIG. 3. This reduces bending strains by 50% as predicted by equations (2) and (3).

$$\varepsilon_T \approx \frac{T}{D} \qquad (2)$$

$$\varepsilon_{T/2} \approx \frac{T/2}{D} = 50\% \times \varepsilon_T, \qquad (3)$$

wherein
Epsilon is bending strain,
T is thickness of the load bearing member 2 and
D is the diameter of bending.

A significant change in strain state, particularly on a rope wheel, is a sign of particularly delamination. Measuring and monitoring the strain state of the load bearing member 2 on a rope wheel enables early detection of delamination before major guidance failure or structural disintegration of the rope has occurred. This enables preparation for rope replacement in early phase. If strains of the load bearing member 2 are continuously or intermittently measured and monitored, it can be facilitated that the formation of a delamination may be observed in early phase. The change in strain state may be detected by measuring strain by strain gauges, but also in alternative ways.

The strains being measured are preferably strains appearing in the load bearing member 2 at least substantially in longitudinal direction of the load bearing member 2. Hereby, occurrence of delamination or its pre-stage can be most effectively detected by aid of the strain measuring. The strain orientation is parallel to said longitudinal direction or at an acute angle substantially less than 90 degrees from said longitudinal direction, said angle preferably being however less than 60 degrees.

In the preferred embodiment, strain of each said portion A,B is measured when the portion A,B is arched around an axis extending in width direction w of the rope. In the elevator system implementing the method, each said portion becomes arched occasionally when passing around a rope wheel 12 as illustrated in FIGS. 1-3. Strain of each said portion A,B is particularly measured when the portion A,B is arched, and the measuring point is a point of the section where the portion substantially arcs, i.e. where the portion A,B does not extend straight, preferably with diameter less than 1.5 meters. This is implemented preferably such that strain of each said section A,B is measured when the section A,B rests (via its coating, if one exists) on a circumference of a rope wheel 12 of the hoisting device.

In the preferred embodiment the rope is a belt i.e. the rope 1, 1', 1" is substantially larger in its width-direction w than thickness-direction t. Preferred alternative belt designs have been illustrated in FIGS. 4-6. Belt-shape has the consequence that the rope 1, 1' is bent always in same way in use i.e. around an axis extending in width direction of the rope. Thus, reliability and usability of the strain measuring for comparison are facilitated. Moreover, design of the strain measuring arrangement need not be complicated because it can be built on assumption that the bending is always substantially similar. Also, said load bearing member 2 is preferably non-circular and oriented to extend parallel with longitudinal direction of the rope 1,1',1" throughout the length thereof without twisting around its longitudinal axis. The cross-section of said load bearing member 2 being constant throughout the length of the rope. Hereby, the rope 1,1',1" is simple to manufacture such that strain measurement can be obtained from a cross-sectional position of the load bearing member as intended. Thereby, the rope 1,1',1" is simple to manufacture without challenges with reliability of the measurement.

Figure 4:
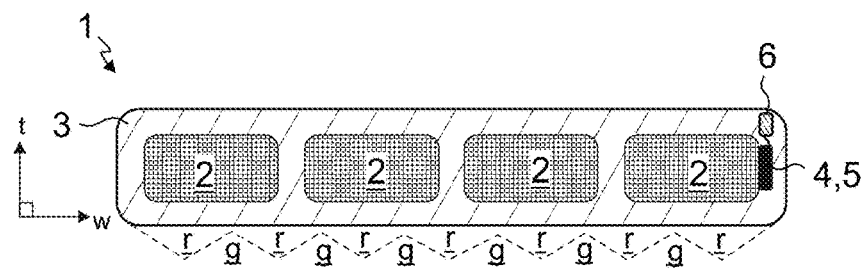
FIGS. 4-6 illustrates a preferred alternative cross sections of the rope, each figure showing a cross sectional view at the point of the portion the strain of which is to be measured.
Figure 5:
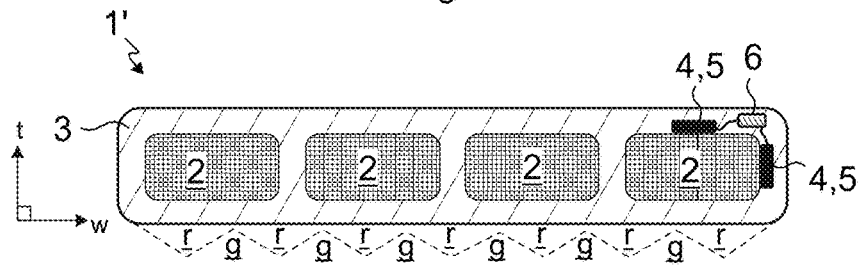
Figure 6:
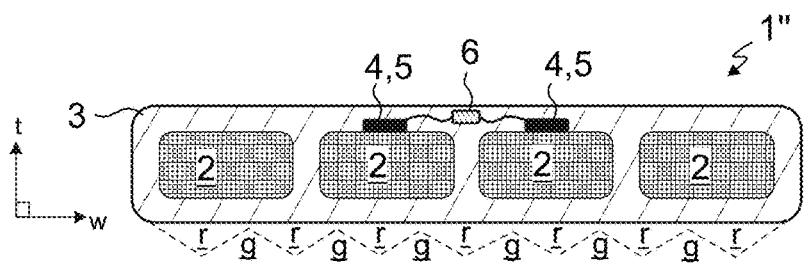

FIGS. 4-6 also illustrate preferred details for the rope structure, which enable the strain measuring by means integrated into the rope 1,1',1". Each of FIGS. 4-6 shows an embodiment where the measuring is performed by aid of one or more strain gauges 4, 5. Each of FIGS. 4-6 shows a cross sectional view at the point of the portion A,B the strain of which is to be measured in the method. Accordingly, there are one or more strain gauges 4,5 fixed on each of said one or more successive portions A,B of the load bearing member 2 for measuring strain of each said portion A,B with one or more strain gauges 4,5. The distance between successive strain gauges 4,5 in longitudinal direction of the rope 1,1',1" is preferably chosen according to the allowable delamination length.

In the embodiments of FIGS. 4 and 5, it is illustrated configurations by which the measuring can be performed for an individual load bearing member 2 can be arranged. FIG. 6 illustrates a configuration by which the measuring can be performed for each of two parallel individual load bearing members 2 of the same rope 1".

Each said strain gauge 4,5 is particularly fixed on a surface of the load bearing member 2. Hereby, forces caused by dimensional changes are transmitted from the load bearing member 2 to the strain gauge 4,5.

The strain gauges 4,5 can be positioned in many alternative ways, the FIGS. 4-6 illustrating preferred alternatives. In these alternatives, said measuring is performed using one or more strain gauges 4,5 fixed on a face of the load bearing member 2 which face faces in width direction of the rope 1,1',1" and/or using one or more strain gauges 4,5 fixed on a face of the load bearing member 2 which face faces in thickness direction of the rope 1,1',1". It is preferred that when measuring the strain, the strain gauge 4,5 is not compressed between the load bearing member and a rope wheel. This can be avoided if the rope comprises strain gauges 4,5 that are outside the thickness directional projection of the load bearing members of the rope as in FIGS. 4 and 5 and/or if the strain gauges 4,5 are placed on a face of the load bearing member 2 which face faces in thickness direction of the rope 1,1',1" and away from the rope wheel when the turning around it.

In the illustrated embodiments, each said strain gauge 4,5 is covered by the coating 3 of the rope 1,1',1", whereby the strain gauges 4,5 are protected from external wear, dirt and impacts. The coating 3 can be transparent such that the strain gauges 4,5 are visible from outside the rope 1,1',1", which would make easier to locate and inspect these components.

Figure 7:
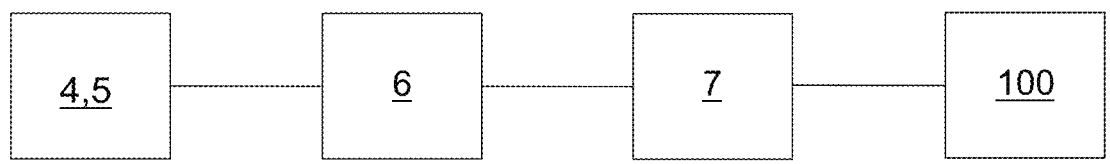
FIG. 7 illustrates how the strain sensing means are linked with the control means for automatically controlling movement of the load of the hoisting device.

FIGS. 4-6 also illustrate a communication unit 6 with which the strain gauges 4,5 are connected for transmitting measurement data away from the strain gauges 4,5. Preferably, the communication unit 6 is a wireless communication unit 6 installed within the rope 1,1',1", as illustrated. However, the communication unit 6 could alternatively be external to the rope and in wired connection with the strain gauges 4,5. As the wiring is long and difficult to arrange, a wireless solution is simpler in many cases. For enabling wireless communication, the wireless communication unit 6 preferably comprises an antenna 60 suitable for transmitting wirelessly data. In the preferred embodiment illustrated, the measurement data is transmitted from strain gauges with said wireless communication unit 6 installed within the rope wirelessly to a receiver 7 external to the rope 1,1',1". The wireless communication unit 6 is preferably within the rope 1,1',1" and covered by the coating 3 whereby it is protected from external wear, dirt and impacts. FIG. 7 illustrates how the strain gauges 4,5 are linked with the control means 100 for automatically controlling movement of the load 10 of the hoisting device. As presented, it is preferred that the strain gauges 4,5 are connected with said wireless communication unit 6, which is connected/connectable with a receiver 7, which receiver is connected/connectable with the control means 100 for automatically controlling movement of the load 10 of the hoisting device.

Figure 8:
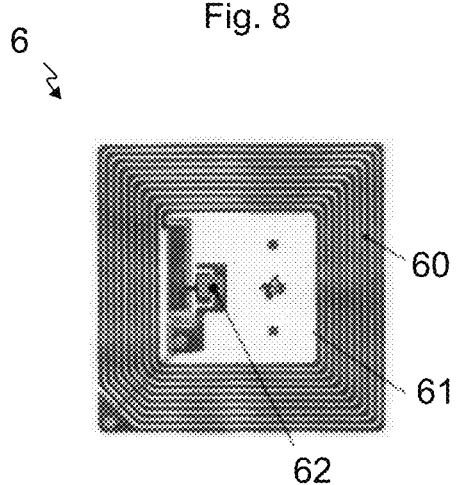
FIG. 8 illustrates a preferred embodiment of a wireless communication unit utilized in a preferred embodiment.

FIG. 8 illustrates a preferred embodiment of the wireless communication unit 6. In this embodiment, the wireless communication unit 6 is in the form of an RFID unit. It comprises an antenna 60 suitable for transmitting wirelessly data and a chip 62. The chip 62 can contain a memory for storing data. Moreover, the RFID unit comprises a substrate 61 on which the antenna 60 and a chip 62 are mounted. The chip 62 can be arranged, such as programmed, to analyze input signal it receives from strain gauges 4,5, and possibly also the comparison step. Thereby at least part of the steps measuring and comparing can be performed locally by the strain gauges 4,5 and the RFID unit.

It is also preferable, although not necessary that the rope 1, 1" is substantially larger in its width-direction w than thickness-direction t and the wireless communication unit 6 installed within the rope 1,1',1" covered by the coating 3 and outside the thickness directional projection of the load bearing members 2 of the rope 1, 1", as illustrated in FIGS. 4 and 6. Thus, it remains away from between the load bearing member and a rope wheel, whereby it is protected from destructive compression and wireless transmission is unblocked by load bearing members 2.

The wireless communication unit 6 can be surrounded by the coating 3, but alternatively it can be directly mounted on a surface of a load bearing member 2. Should it be acceptable that the wireless communication unit 6 is not protected by the coating 3, it can alternatively be mounted on the surface of the coating 3.

The chip 62 can be passive or active type. Passive means here that energy will be supplied by a device external to the rope 1,1',1", like a wireless receiver 7 in proximity of the rope 1,1',1" and forming a chip reader. This is preferably then implemented such that the wireless communication unit 6 is an RFID unit with antenna providing the required power to the chip for energizing its operation as well as for transmitting wirelessly data to an external receiver 7. Active means here that there is small energy storage included on the side of the chip so it can operate without external device. Charging of the active chip can be provided by a device external to the rope 1,1',1", like a wireless receiver 7 in proximity of the rope 1,1',1" and forming a chip reader.

The chip 62 can contain manufacturing data, like manufacturing batch identification, date, time, length (or location of the rope vs. manufacturing process) as well as critical process parameters and conditions, if needed. Other suitable data can be included. Such data can include also temperature data and/or moisture data indicating prevailing temperature and/or moisture of the load bearing member. This would be advantageous as they may have an impact on fatigue resistance of the load bearing member. The data will be stored on the chips during manufacturing. The storing and manipulation of the data stored can be performed RFID method or similar, for instance.

Said at least one reference can comprises a reference, which has been input by a person in the monitoring system of the hoisting device performing said method and/or a reference determined automatically by the monitoring system of the hoisting device performing said method. Preferably, the measured strain and reference have each a numerical value.

Preferably, said at least one reference comprises a reference which is a strain measured from the same portion A,B of the load bearing 2 earlier, or a strain measured from some other portion A,B of the load bearing 2, or a strain which is an average strain calculated from plurality of measured strains of one or more portions A,B of the load bearing 2, or a measured strain of a portion A,B of another, parallel, load bearing member 2 extending parallel with the load bearing member 2 under inspection, or a measured strain of a portion A,B of another load bearing member 2 extending parallel with the load bearing member 2 under inspection, said portion of another parallel load bearing member preferably being beside the portion in question.

As mentioned, one option is that the method comprises comparison of strains of parallel, i.e. different, load bearing members 2. Said two parallel load bearing members are load bearing members of the same rope or of two different parallel ropes. As mentioned above, FIG. 6 illustrates a configuration by which the measuring can be performed for each of two parallel individual load bearing members 2 of the same rope 1". In this embodiment, the strain gauges 4,5 of the two parallel individual load bearing members 2 have been connected to the same communication unit 6, which is advantageous due to simplicity of data transmission, but also because it opens a possibility to perform simply a comparison step using as a reference which is a measured strain of a portion A,B of another, parallel, load bearing member 2 extending parallel with the load bearing member 2 under inspection.

Generally, the method comprises performing one or more predefined actions if the comparison fulfills one or more criteria, said criteria including preferably one or more of the following
the measured strain is greater than a reference,
the measured strain is equal to a reference,
the measured strain is smaller than a reference,
the measured strain is null.

These all criteria can be monitored simultaneously using a reference range having two end points.

Said one or more predefined actions preferably include one or more of the following: sending an alarm signal, stopping the hoisting device, preventing use of the hoisting device.

Generally, it is preferable that said rope 1,1',1" is a rope installed in the hoisting device, such as an elevator for transporting passengers and/or goods. The method is preferably suitable for monitoring as part of continuous maintenance supervision to be carried out during lifetime of the hoisting device, whereby it is preferably that said rope is a rope installed in a hoisting device and already used therein for a period of time. Said period can be for example more than a month but the period can be longer more than a year.

Particularly, it is preferred that said rope is a rope installed in the hoisting device in a position where it is to be used and said measuring is performed without removing the rope from its position in the hoisting device. This enables monitoring during use of the hoisting device, for instance. Accordingly, said rope can suspend one or more loads of the hoisting device when said measuring is performed.

Figure 10:
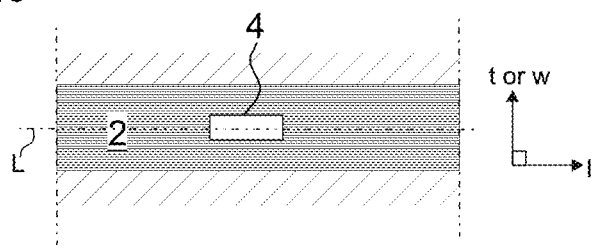
FIGS. 10 and 11 illustrate preferred alternative strain gauge positioning configurations.
Figure 11:
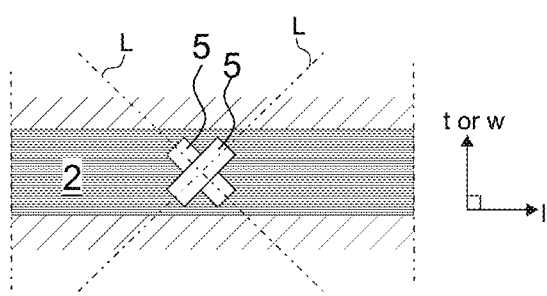

FIGS. 10 and 11 illustrate preferred alternative strain gauge positioning configurations. The configurations are viewed in direction orthogonal to the surface of the load bearing member 2 on which the strain gauge(s) 4,5 is/are fixed, the direction being width direction w or thickness direction t of the rope 1,1',1" in the embodiments of FIGS. 4-6. In the embodiment of FIG. 10, the measuring configuration comprises a strain gauge 4 having a measuring direction L parallel with the longitudinal direction of the load bearing member 2 on which it is fixed. Each strain gauge 4,5 is arranged to measure strain of the load bearing member 2 in the measuring direction L thereof.

In the embodiment of FIG. 11, the measuring configuration comprises a strain gauge 5 having a measuring direction L at an angle relative to the longitudinal direction of the load bearing member 2 on which it is fixed. In this embodiment, there are particularly two of this kind of strain gauges 5 fixed on one and the same portion of the load bearing member and crossing each other. When an inclined strain gauge 5, preferably said two strain gauges 5, is/are fixed particularly on the side face, i.e. a face facing in width direction of the rope 1,1', as showed in FIGS. 4 and 5, ability to detect delamination is excellent, because each strain gauge 5 is then likely to extend over the emerging delamination crack and therefor positioned where strain changes caused by the emerging delamination are most considerable. The two strain gauges crossing each other gives them ability to detect different strain directions reducing dependency on direction of the strain.

Figure 9:
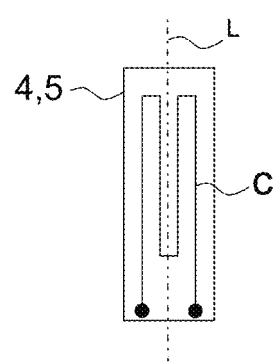
FIG. 9 illustrates a preferred embodiment of a strain gauge.

Strain gauges are commercially available components. There are traditional wired strain gauges, but there are also wireless strain gauges (e.g. RFID-based, as described elsewhere in the application) which can be read through a coating 3 made of polymer material. Either of these kinds may be utilized in the invention of this application. FIG. 9 illustrates a preferred embodiment of the strain gauge 4,5. In this case, the strain gauge 4,5 is an ohmic resistance strain gauge. The ohmic resistance strain gauge 4,5 comprises a conductor c extending in longitudinal direction of the strain gauge 10. Particularly, it is preferable that the conductor c extends back and forth in longitudinal direction of the strain gauge 4,5. In the method the strain is measured from an electrical property of the conductor c, most preferably the ohmic resistance thereof. The strain gauge 4,5 being of this kind, the system should be able to analyze an electrical property of the conductor c, which is most preferably ohmic resistance thereof, for converting it into a measurement value. This function can be assigned to any suitable component in the system. It is preferred that the wireless communication unit 6, in particular the chip 62 thereof, is assigned to analyze an electrical property of the conductor c, most preferably ohmic resistance thereof, and convert it to a measurement value. Even slight strain changes of the load bearing member 2 will cause a detectable change in the ohmic resistance of the conductor c. Thus, the solution using strain gauges of this kind can be very accurate.

Figure 12:
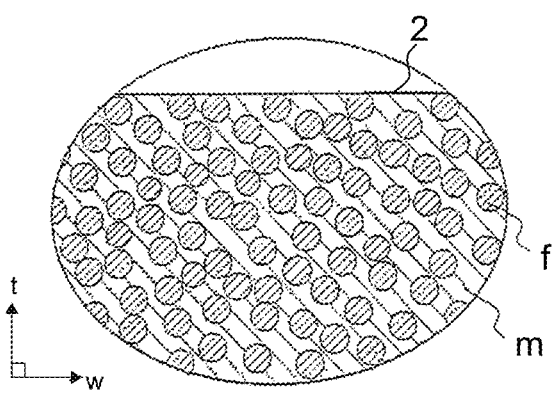
FIGS. 12 and 13 illustrate preferred details of the load bearing member of the rope. The foregoing aspects, features and advantages of the invention will be apparent from the drawings and the detailed description related thereto.
Figure 13:
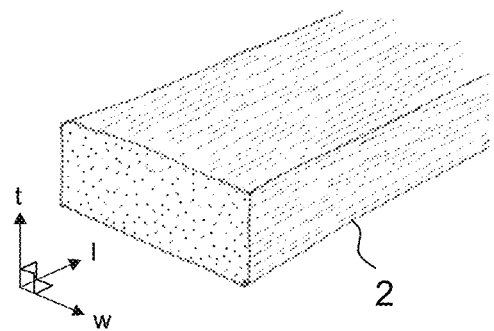

As mentioned, each said load bearing member 2 is preferably made of composite material comprising reinforcing fibers embedded in polymer matrix, said reinforcing fibers preferably being carbon fibers or glass fibers. FIG. 12 illustrates a preferred inner structure for the load bearing member 2 made of this kind of material, showing inside the circle an enlarged view of the cross section of the load bearing member 2 close to the surface thereof, as viewed in the longitudinal direction 1 of the load bearing member 1. The parts of the load bearing member 2 not showed in FIG. 12 have a similar structure. FIG. 13 illustrates the load bearing member 2 three dimensionally. The load bearing member 2 is made of composite material comprising reinforcing fibers f embedded in polymer matrix m. The reinforcing fibers f being in the polymer matrix means here that the individual reinforcing fibers f are bound to each other with a polymer matrix m. This has been done e.g. in the manufacturing phase by immersing them together in the fluid material of the polymer matrix which is thereafter solidified. The reinforcing fibers f are distributed substantially evenly in polymer matrix m and bound to each other by the polymer matrix m. The load bearing member 2 formed is a solid elongated rod-like one-piece structure. Said reinforcing fibers f are most preferably carbon fibers, but alternatively they can be glass fibers, or possibly some other fibers. Preferably, substantially all the reinforcing fibers f of each load bearing member 2 are parallel with the longitudinal direction of the load bearing member 2. Thereby, the fibers f are also parallel with the longitudinal direction of the rope 1,1',1" as each load bearing member 2 are to be oriented parallel with the longitudinal direction of the rope 1,1',1". This is advantageous for the rigidity as well as behavior in bending. Owing to the parallel structure, the fibers in the rope 1,1',1" will be aligned with the force when the rope 1,1',1" is pulled, which ensures that the structure provides high tensile stiffness. The fibers f used in the preferred embodiments are accordingly substantially untwisted in relation to each other, which provides them said orientation parallel with the longitudinal direction of the rope 1,1',1". This is in contrast to the conventionally twisted elevator ropes, where the wires or fibers are strongly twisted and have normally a twisting angle from 15 up to 40 degrees, the fiber/wire bundles of these conventionally twisted elevator ropes thereby having the potential for transforming towards a straighter configuration under tension, which provides these ropes a high elongation under tension as well as leads to an unintegral structure. The reinforcing fibers f are preferably long continuous fibers in the longitudinal direction of the load bearing member 2, preferably continuing for the whole length of the load bearing member 2.

As mentioned, the reinforcing fibers f are preferably distributed in the aforementioned load bearing member 2 substantially evenly. The fibers f are then arranged so that the load bearing member 2 would be as homogeneous as possible in the transverse direction thereof. An advantage of the structure presented is that the matrix m surrounding the reinforcing fibers f keeps the interpositioning of the reinforcing fibers f substantially unchanged. It equalizes with its slight elasticity the distribution of force exerted on the fibers, reduces fiber-fiber contacts and internal wear of the rope, thus improving the service life of the rope 1,1',1". Owing to the even distribution, the fiber density in the cross-section of the load bearing member 2 is substantially constant. The composite matrix m, into which the individual fibers f are distributed, is most preferably made of epoxy, which has good adhesiveness to the reinforcement fibers f and which is known to behave advantageously with reinforcing fibers such as carbon fiber particularly. Alternatively, e.g. polyester or vinyl ester can be used, but any other suitable alternative materials can be used.

The matrix m has been applied on the fibers f such that a chemical bond exists between each individual reinforcing fiber f and the matrix m. Thereby a uniform structure is achieved. To improve the chemical adhesion of the reinforcing fiber to the matrix m, in particular to strengthen the chemical bond between the reinforcing fiber f and the matrix m, each fiber can have a thin coating, e.g. a primer (not presented) on the actual fiber structure between the reinforcing fiber structure and the polymer matrix m. However, this kind of thin coating is not necessary. The properties of the polymer matrix m can also be optimized as it is common in polymer technology. For example, the matrix m can comprise a base polymer material (e.g. epoxy) as well as additives, which fine-tune the properties of the base polymer such that the properties of the matrix are optimized. The polymer matrix m is preferably of a hard non-elastomer, such as said epoxy, as in this case a risk of buckling can be reduced for instance. However, the polymer matrix need not be non-elastomer necessarily, e.g. if the downsides of this kind of material are deemed acceptable or irrelevant for the intended use. In that case, the polymer matrix m can be made of elastomer material such as polyurethane or rubber for instance.

The reinforcing fibers f together with the matrix m form a uniform load bearing member, inside which no substantial abrasive relative movement occurs when the rope is bent. The individual reinforcing fibers f of the load bearing member 2 are mainly surrounded with polymer matrix m, but random fiber-fiber contacts can occur because controlling the position of the fibers in relation to each other in their simultaneous impregnation with polymer is difficult, and on the other hand, elimination of random fiber-fiber contacts is not necessary from the viewpoint of the functioning of the solution. If, however, it is desired to reduce their random occurrence, the individual reinforcing fibers f can be pre-coated with material of the matrix m such that a coating of polymer material of said matrix is around each of them already before they are brought and bound together with the matrix material, e.g. before they are immersed in the fluid matrix material.

As above mentioned, the matrix m of the load bearing member 2 is most preferably hard in its material properties. A hard matrix m helps to support the reinforcing fibers f, especially when the rope bends, preventing buckling of the reinforcing fibers f of the bent rope, because the hard material supports the fibers f efficiently. To reduce the buckling and to facilitate a small bending radius of the load bearing member 1, among other things, it is therefore preferred that the polymer matrix m is hard, and in particular non-elastomeric. The most preferred materials for the matrix are epoxy resin, polyester, phenolic plastic or vinyl ester. The polymer matrix m is preferably so hard that its module of elasticity (E) is over 2 GPa, most preferably over 2.5 GPa. In this case the module of elasticity E is preferably in the range 2.5-10 GPa, most preferably in the range 2.5-4.5 GPa. There are commercially available various material alternatives for the matrix m which can provide these material properties. Preferably over 50% proportion of the surface area of the cross-section of the load bearing member 2 is of the aforementioned reinforcing fiber, preferably such that 50%-80% proportion is of the aforementioned reinforcing fiber, more preferably such that 55%-70% proportion is of the aforementioned reinforcing fiber, and substantially all the remaining surface area is of polymer matrix m. Most preferably, this is carried out such that approx. 60% of the surface area is of reinforcing fiber and approx. 40% is of matrix material (preferably epoxy material). In this way a good longitudinal stiffness for the load bearing member 1 is achieved. As mentioned carbon fiber is the most preferred fiber to be used as said reinforcing fiber due to its excellent properties in hoisting appliances, particularly in elevators. However, this is not necessary as alternative fibers could be used, such as glass fiber, which has been found to be suitable for the hoisting ropes as well. The load bearing member 2 is preferably completely non-metallic, i.e. made not to comprise metal.

In the preferred embodiments, an advantageous structures for the load bearing members 2 and the rope 1,1',1" have been disclosed. However, the invention can be utilized with load bearing members and the ropes having other kind of structure such as with those having different materials and/or shapes.

As mentioned, change in strain state of a load bearing member, particularly when turning on a rope wheel, is a sign of delamination. In the above, strain gauges are described as the most advantageous means for measuring the strain. However, strain may be detected also in alternative ways, such as:

- Optical strain measurement (FBG) integrated in the load bearing member 2.
- Digital image correlation (DIC) which is able to detect the relative movement between top and bottom halves of the load bearing member 2.
- Moiré interferometry. In this technique the rope surface is covered with a grid of closely spaced lines. The surface is then viewed at normal incidence through an optical grid with the same line spacing. Alternatively, the grid may be projected on the rope (FIG. 10). The viewing point is on a pulley or the tangent point of rope and pulley. Any damage in the load bearing member 2 becomes visible, since delamination changes (reduces) the line spacing on rope surface due to reduced internal strains. This causes abnormal interference between the viewing grid and rope surface.

As mentioned, the rope 1,1',1" is preferably a belt. The rope 1,1',1" can then be in the form of a smooth-sided belt without uneven surface pattern as illustrated with continuous outline in FIGS. 4-6. The rope is then without teeth or longitudinal ribs protruding in thickness direction t of the rope 1,1',1". Alternatively, the rope 1,1',1" can have at least one side provided with an uneven surface pattern, such as a rib pattern comprising ribs protruding in thickness direction t of the rope 1,1',1" or a tooth pattern comprising teeth protruding in thickness direction t of the rope 1,1',1". Then, this side (facing downwards in the FIGS. 4-6) with an uneven surface pattern, such as a grooved or toothed shape can pass against a circumference of a rope wheel which circumference is shaped to form a counterpart for the shape of the contoured side of the rope 1,1',1". A rib pattern is illustrated in FIGS. 4-6 with a broken outline. The rib pattern comprises ribs r oriented to extend in longitudinal direction 1 of the rope 1,1',1" and protruding in thickness direction t of the rope 1,1',1" as well as grooves g between the ribs r. If the rope 1,1',1" is to have an uneven surface pattern, the uneven surface pattern is preferably formed by the coating 3.

In the embodiments illustrated in the Figures, the invention has been utilized in an elevator with 1:1 roping ratio. However, the invention can be used correspondingly in other kind of configurations such as different roping ratios, e.g. with 2:1 roping ratio. In the embodiments illustrated in the Figures, the measurement has been performed when the portion A,B rests on a circumference of a rope wheel 12 of the hoisting device which rope wheel 12 is a non-driven rope wheel of the hoisting machinery. However, the measurement could be performed when the portion A,B rests on a circumference of any rope wheel of the hoisting device, such as the drive wheel 13 of the hoisting device or some other non-driven rope wheel of the hoisting machinery.

Generally, the rope being monitored with the method can be a suspension rope for suspending a load to be hoisted, as presented in FIG. 1 for instance. However, it can alternatively be a rope of a hoisting device serving some other function than suspending the load. In an elevator, such function can be the compensation function and/or the tie down function of the elevator, in which cases the rope interconnects and hangs between the elevator car 10 and counterweight 11, and passes around one or more rope wheels, which would in this case positioned in the bottom end of the hoistway H.

Generally, it is preferred that particularly delamination cracks are detected by the measuring strains and the comparing. Strain measurement data can however additionally be used for other purposes, particularly when obtained by aid of strain gauges, such as in determination of rope forces, which can be utilized in determination of load of the hoisting device or in adjustment of the roping system.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A method of monitoring a condition of a rope of a hoisting device, the rope including one or more load bearing members oriented to extend parallel with a longitudinal direction of the rope throughout a length thereof, the method comprising:
   reading, via a receiver located adjacent to a rope wheel of the hoisting device, measurements of strains of one or more portions of a load bearing member of the rope as the one or more portions of the one or more load bearing members rests on a circumference of the rope wheel such that the measurements are associated with the strains observed when the one or more portions are arched by the rope wheel; and
   comparing the measured strains of the one or more portions of the load bearing member of the rope with at least one reference.

2. The method according to claim 1, wherein a measuring point is where the one or more portions substantially arcs, with diameter less than 1.5 meters.

3. The method according to claim 1, wherein each said load bearing member is made of composite material including reinforcing carbon fibers or glass fibers embedded in polymer matrix.

4. The method according to claim 1, wherein the rope is substantially larger in its width-direction than thickness-direction.

5. The method according to claim 1, wherein said measuring is performed by aid of one or more strain gauges.

6. The method according to claim 1, wherein the rope includes one or more strain gauges fixed on each of said one or more portions of the load bearing member for measuring strain of the portion with one or more strain gauges.

7. The method according to claim 5, wherein the rope includes a coating forming an outer surface of the rope, with the one or more load bearing members embedded in the coating.

8. The method according to claim 7, wherein each said strain gauge is covered by the coating.

9. The method according to claim 1, wherein the method comprises:
measuring strains of a plurality of portions of the one or more load bearing members of the rope; and
comparing each measured strain with at least one reference, wherein said plurality of portions are portions of the one or more load bearing members of the rope successive in longitudinal direction of the load bearing member of the rope.

10. The method according to claim 1, wherein said at least one reference includes one of (i) a reference input by a person to a monitoring system of the hoisting device performing said method or (ii) a reference determined automatically by the monitoring system of the hoisting device performing said method.

11. The method according to claim 1, wherein said at least one reference includes one of (i) a reference which is a strain measured from the same portion of the load bearing earlier, or a strain measured from some other portion of the load bearing, or (ii) a strain which is an average strain calculated from plurality of measured strains of one or more portions of the load bearing, or (iii) a measured strain of a portion of another, parallel, load bearing member extending parallel with the load bearing member under inspection, said portion of another parallel load bearing member preferably being beside the portion in question.

12. The method according to claim 1, wherein the method comprises:
performing one or more predefined actions if the comparing the measured strains with the at least one reference fulfills one or more criteria.

13. The method according to claim 1, wherein said measuring is performed using one or more strain gauges fixed on either (i) a face of the load bearing member which face faces in width direction of the rope or (ii) a face of the load bearing member which face faces in thickness direction of the rope.

14. The method according to claim 1, wherein said measuring is performed using one or more strain gauges having a measuring direction parallel with the longitudinal direction of the load bearing member on which it is fixed or using one or more strain gauges having a measuring direction at an angle relative to the longitudinal direction of the load bearing member on which it is fixed.

15. The method according to claim 1, wherein the method comprises:
transmitting measurement data from one or more strain gauges to an external receiver with a wireless communication unit installed within the rope.

16. The method according to claim 15, wherein the wireless communication unit is an RFID unit.

17. The method according to claim 1, wherein said rope is a rope installed in the hoisting device.

18. A hoisting device, comprising:
a rope including one or more load bearing members oriented to extend parallel with longitudinal direction of the rope throughout a length thereof;
a rope wheel with a receiver adjacent thereto; and
a controller configured to,
read, via the receiver, measurements of strains of one or more portions of the one or more load bearing members of the rope as the one or more portions of the one or more load bearing members rests on a circumference of the rope wheel such that the measurements are associated with the strains observed when the one or more portions are arched by the rope wheel; and
compare the measured strains of the one or more portions of the one or more load bearing members of the rope with at least one reference.

19. The hoisting device according to claim 18, wherein the receiver is located adjacent to the rope wheel such that the controller reads the measurements of the strains at a measuring point where the one or more portions substantially arcs, with diameter less than 1.5 meters.

20. The hoisting device according to claim 18, wherein said at least one reference includes one of (i) a reference which is a strain measured from the same portion of the load bearing earlier, or a strain measured from some other portion of the load bearing, or (ii) a strain which is an average strain calculated from plurality of measured strains of one or more portions of the load bearing, or (iii) a measured strain of a portion of another, parallel, load bearing member extending parallel with the load bearing member under inspection, said portion of another parallel load bearing member preferably being beside the portion in question.

* * * * *